United States Patent
Kiera

[19]
[11] Patent Number: 5,806,461
[45] Date of Patent: Sep. 15, 1998

[54] CATWALK LITTER BOX

[76] Inventor: Heiko-Roberto Kiera, 222 Lake Dr., Oviedo, Fla. 32765

[21] Appl. No.: 852,826

[22] Filed: May 7, 1997

[51] Int. Cl.$^6$ .................................................... A01K 1/035
[52] U.S. Cl. .............................................................. 119/165
[58] Field of Search ..................................... 119/165, 163, 119/166, 169, 170

[56] References Cited

U.S. PATENT DOCUMENTS

| | | | |
|---|---|---|---|
| 3,885,523 | 5/1975 | Coleman | 119/165 |
| 4,884,526 | 12/1989 | Giannakopoulos . | |
| 4,981,104 | 1/1991 | Goodwin | 119/168 |
| 5,044,325 | 9/1991 | Miksitz | 119/165 |
| 5,048,465 | 9/1991 | Carlisi | 119/166 |
| 5,140,948 | 8/1992 | Roberts | 119/165 |
| 5,329,879 | 7/1994 | Walton | 119/166 |
| 5,361,725 | 11/1994 | Baillie et al. | 119/165 |
| 5,460,122 | 10/1995 | Reinartz | 119/164 |
| 5,564,364 | 10/1996 | Kovacs et al. | 119/165 X |
| 5,676,090 | 10/1997 | Cannady, Jr. | 119/165 |

*Primary Examiner*—Robert P. Swiatek
*Assistant Examiner*—James S. Bergin
*Attorney, Agent, or Firm*—Julian C. Renfro, Esq.

[57] ABSTRACT

A litter box formed of an upper portion and a lower portion normally clamped together to define an enclosure in which kitty litter can be contained and foul odors confined. The lower portion is adapted to contain a quantity of kitty litter for receiving the waste products emanating from the pet, whereas the upper portion contains an aperture through which the pet can enter or leave, as well as containing a grill-like uppermost portion through which foul odors can escape. The lower portion contains an elongate, perforate walkway disposed above the kitty litter and extending in the immediate vicinity of the aperture, with an interior wall in the enclosure disposed closely adjacent the walkway. The perforate walkway is supported relatively close to the aperture, with the wall being placed in such proximity to the aperture as to require the pet to walk along the walkway at such time as the pet is to exit from the litter box through the aperture. The perforate walkway serves to clean the paws of the pet and thereby prevent the pet from tracking portions of the litter out of the litter box. Preferably the interior wall is attached to the walkway so as to be removed with the walkway from the lower portion at such time as the litter is to be cleansed of solid material. A recess is provided in a surrounding relationship to the grill-like portion, such that an electrically-powered odor removing component can be removably received in such recess.

15 Claims, 4 Drawing Sheets

CATWALK LITTER BOX

RELATIONSHIP TO PREVIOUS INVENTION

This invention bears a definite relationship to my application entitled "VENTILATION SYSTEM ADAPTED FOR USE WITH LITTER BOX," Ser. No. 08/402,851, filed Mar. 03, 1995, which became U.S. Pat. No. 5,655,478 on Aug. 12, 1997.

BACKGROUND OF THE INVENTION

Many cat fanciers and others who keep animals in a home, apartment or other such living space provide devices variously known as pet litter boxes or kitty litter boxes, so that the animal may be left unattended for relatively long periods of time. One example of a device is the Miksitz U.S. Pat. No. 5,044,325 entitled "Ventilated Litter Box," which provides a tray with a porous bottom below which an electrically operated exhaust fan is located. Connected to the outlet of the exhaust fan is a flexible duct leading through an outer wall so that the foul air from the litter box can be delivered out of doors.

The Roberts U.S. Pat. No. 5,140,948 entitled "Vented Cat Litter Box Apparatus" is generally along the same lines except that it utilizes a fan motor in a duct leading out of the litter box, with the operation of the fan motor likewise delivering the foul odors of the litter box to an outside location.

Although these devices containing built-in forced air ventilation systems are generally satisfactory, they are necessarily more expensive than ordinary litter boxes and in many instances are difficult to repair. It was therefore the intent of my previous invention to accomplish the same basic goal as these patented devices, but at a considerable dollar saving.

The Giannakopoulos U.S. Pat. No. 4,884,526 entitled "Disposable Kitty Litter Box and Bag Combination" bears a slight relationship to the instant invention, with that patent teaching a disposable kitty litter box having an upper portion in the nature of a bag whose upper sides can be gathered together and tied, thus to simplify the disposition of the kitty litter that has already become soiled during use.

The Goodwin U.S. Pat. No. 4,981,104 entitled "Disposable Flea Repellant Kitty Litter Box" is a device involving a moisture-resistant cardboard base and an upper portion that on the one hand can be folded flat for shipment and sale, but later deployed into a tent-shaped configuration when the device is to be readied for use by a small animal.

The Carlisi U.S. Pat. No. 5,048,465 entitled "Self-Cleaning Kitty Litter Box" involves a device equipped with a motor and timing device that can be energized periodically to move a rake upwardly through the kitty litter, so as to push solid waste to one end of the pan. The solid waste is dropped into a storage tray, with this arrangement permitting the same kitty litter to continue to be used until such time as the kitty litter has become so soiled as to warrant being completely discarded.

The Walton U.S. Pat. No. 5,329,879 entitled "Cat Waste Elimination System . . . " teaches a fence-like structure that substantially surrounds and sits atop a mound of kitty litter, thus cutting down on the likelihood of kitty litter being spread around the room in which the cat box is located.

The Reinartz U.S. Pat. No. 5,460,122 entitled "Self Cleaning Kitty Litter Box Having a Movable Floor" involves a device utilizing a flexible floor having cogged wheels on the lower side, with the arrangement being such that solid wastes are delivered to a point of disposition.

All of these devices are of more expensive construction than that which is involved in connection with the present invention, and my invention is sincerely believed to represent a substantial advance over this prior art.

SUMMARY OF THE INVENTION

A litter box in accordance with this invention is formed of an upper portion and a lower portion normally clamped together to define an enclosure in which kitty litter can be contained and foul odors confined. The lower portion is adapted to contain a quantity of absorptive material known as kitty litter for receiving the waste products emanating from the pet, with this litter material taking a variety of forms, such as made up of ground up corn cobs, shavings or chips of cedar, Bentonite clay, and the like. The upper portion of the litter box contains an aperture through which the pet can enter or leave. The upper portion also contains a grill-like uppermost portion through which foul odors can escape. In accordance with this invention, I may utilize an electrically powered ventilation arrangement designed to sit atop the grill-like portion to rapidly and effectively remove foul odors from the litter box.

The lower portion of the litter box contains a novel elongate perforate walkway disposed above the kitty litter and extending in the immediate vicinity of the exit aperture, with means being provided to define a narrow passage through which the pet must walk when exiting from the litter box. Such means can take the form of an interior wall disposed closely adjacent the walkway, such that the pet must walk over the perforate walkway, with the walkway serving the purpose of cleaning the pet's paws, thus preventing kitty litter being tracked out of the litter box.

I prefer to attach the interior wall to the novel elongate perforate walkway so as to be removed with the walkway from the lower portion at such time as the litter is to be cleansed of solid material.

It is a principal object of this invention to provide a litter box having means therein for preventing absorptive material known as kitty litter from being tracked out of the litter box during the exit of the pet from the litter box.

It is another object of my invention to provide a litter box having an aperture through which the animal can enter or leave, with an elongate perforate walkway disposed above the kitty litter and extending in the immediate vicinity of the aperture, such that the exiting animal must walk across the perforate walkway and thus accomplish a cleaning of its paws before it is able to leave the litter box.

It is still another object of my invention to provide a litter box having an aperture through which the animal can enter or leave, with an elongate perforate walkway disposed above the kitty litter and extending in the immediate vicinity of the aperture, with an interior wall defining with the perforate walkway, a relatively narrow passageway such that the animal is in effect forced to walk across the perforate walkway and thus accomplish a cleaning of its paws before it is able to leave the litter box.

It is yet still another object of my invention to provide a litter box providing a grill-like upper portion surrounded by a recess able to accommodate an electrically-powered odor removing component, so that odors emanating from the litter box can be pulled upwardly through such grill-like portion and delivered to an out-of-doors location.

These and other objects, features and advantages of this invention will become more apparent as the description proceeds.

DETAILED DESCRIPTION

Figure 1:
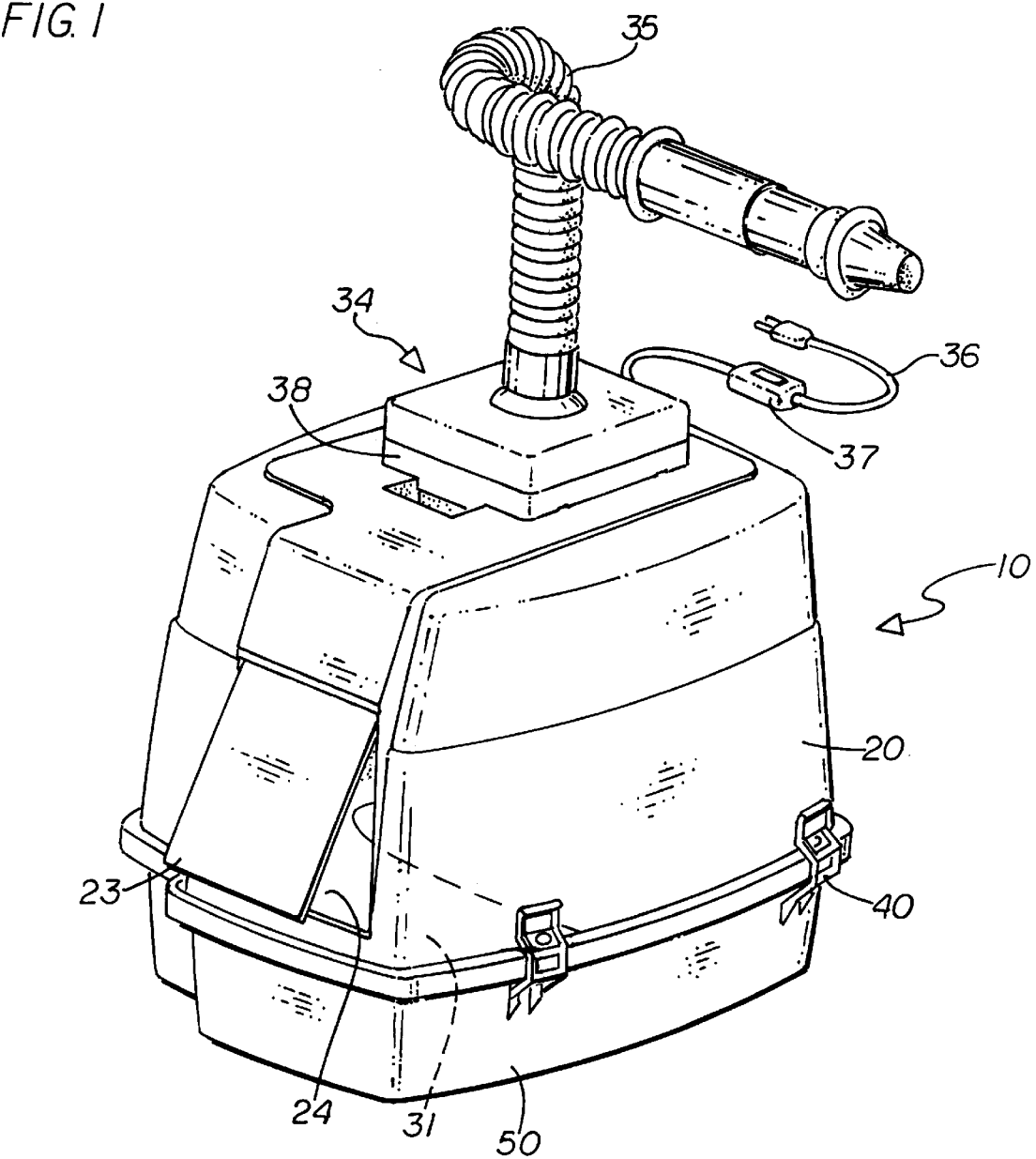
FIG. 1 is a perspective view of a litter box in accordance with this invention, with this view revealing an optional ventilation system that may be attached to the upper portion of the litter box, with portions of my novel perforate catwalk being indicated in this figure by the use of dashed lines.

With initial reference to FIG. 1 it will be seen that I have shown my novel catwalk litter box 10, involving an upper or hood portion 20 and a lower portion 50, with these components being releasably held together by a series of latches 40 of conventional construction. In this manner an enclosure is defined, in the lower portion of which absorptive material commonly referred to as kitty litter can be contained, and in which enclosure foul odors can be confined. The highly advantageous internal configuration I employ, which will shortly be described, is directed toward preventing kitty litter from being scattered as an animal departs after using the litter box.

As is obvious, by opening the latches 40, the hood portion 20 can be readily separated from the bottom portion 50 so that the pet owner can rake the solid waste products out of the litter, or if necessary or desirable, the pet owner can entirely discard the old litter and replace it with new litter.

FIG. 1 reveals the utilization of an essentially conventional door 23, hinged at the top, which forms a closure for the entrance opening or aperture 24 defined in the front of the hood portion 20. The opening or aperture 24 is generally vertically disposed, with the door 23 being able to swing inwardly when the pet enters, and swing outwardly when the pet leaves the litter box. As is obvious, the presence of the door 23 helps confine any odors inside the litter box and also tends to improve its appearance.

Also visible in FIG. 1 is a ventilation device 34 for accomplishing the removal of foul odors from the litter box 10, with this device involving a base member 38 and a flexible pipe or conduit 35 serving to direct foul odors to an out-of-doors location. The device 34 is preferably an electrically powered ventilation arrangement along the lines of the device revealed in my allowed patent application entitled "Ventilation System Adapted For Use with Litter Boxes," Ser. No. 08/402,851, now U.S. Pat. No. 5,655,478.

Figure 2:
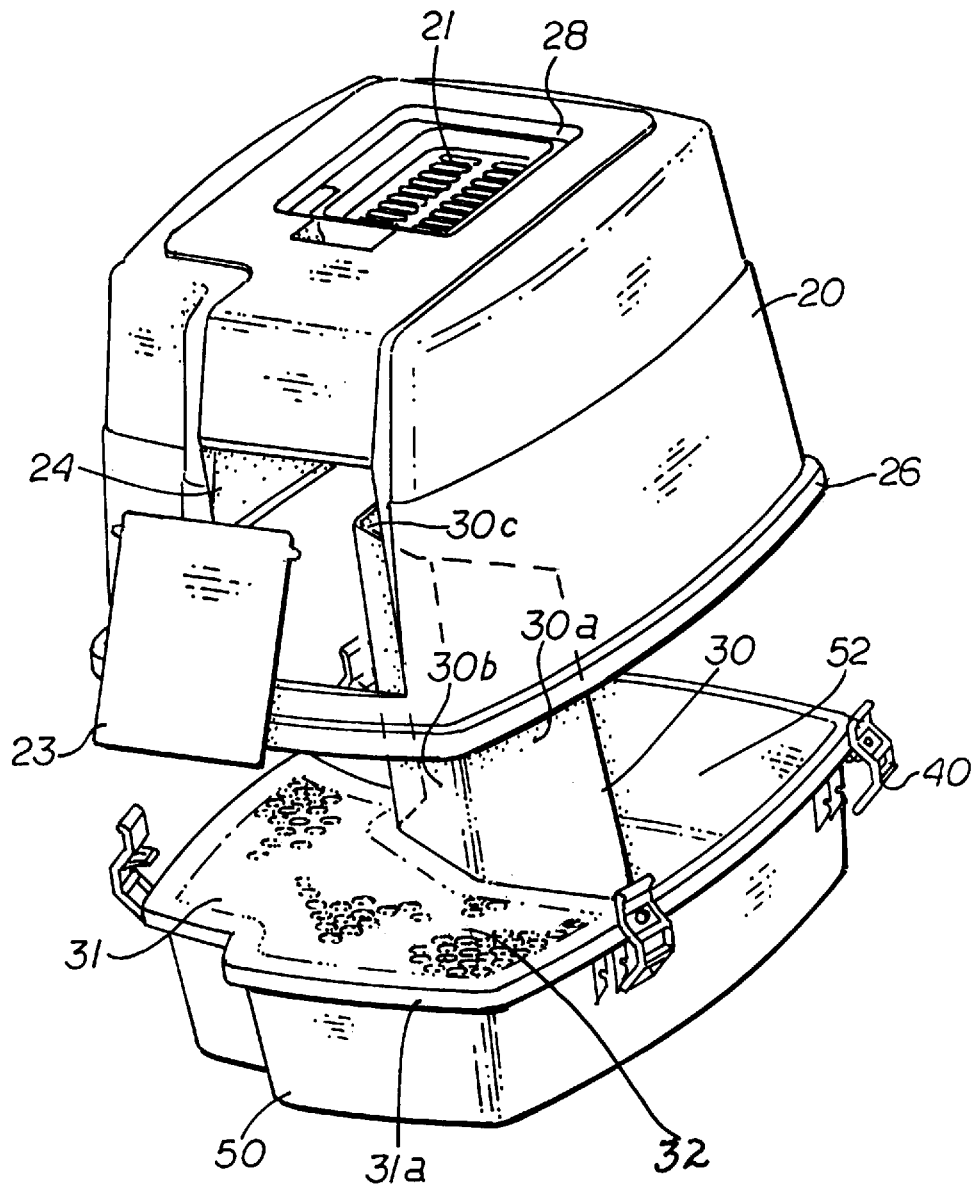
FIG. 2 is a perspective view generally along the lines of FIG. 1 but showing the upper portion in what may be regarded as an exploded relationship to the lower portion of the litter box, in order that details of my novel perforate catwalk or walkway will be revealed.

With reference to FIG. 2, it will be seen that I have provided a four-sided recess 28 in the top surface of the upper portion 20, for receiving the base member 38 of the ventilation device in a leak-free manner. Located in a central portion of the recess 28 is a grating or grill-like portion 21 forming an egress for the escape of odors from the litter box.

When an electrically powered ventilation device is used with the litter box 10, such odors are of course drawn out of the litter box by virtue of a fan provided in the base member 38, which odors are pushed into the flexible pipe or conduit 35 visible in FIG. 1, and thereafter conducted to an out-of-doors location.

As explained in my issued U.S. Pat. No. 5,655,478, by attaching the novel device 34 to the upper part of the hood or upper portion 20 at the location of the grill portion 21, a continuous upward flow of air through the litter box can be created, thereby preventing any buildup of foul odors therein. As mentioned in my above-identified patent, the device 34 may be powered either by house current or batteries, and may be energized to work either continuously or selectively. As may be noted from FIG. 1, the electric cord 36 can be provided with a line switch 37.

Returning to FIG. 2, where the instant novel device is displayed in exploded relation, it can be seen that the open area 52 at the rear part of the lower portion 50 of my device serves as the litter container, which is typically filled fairly full with absorptive material commonly referred to as kitty litter. This litter material may take a variety of forms, such as made up of ground up corn cobs, or shavings or chips of cedar, or it can be created out of Bentonite clay, or the like. Some of the kitty litter products presently on the market have the quality of clumping. Solid wastes as well as kitty litter that has clumped upon being wetted with urine may be readily removed by the pet owner from the area 52 of the lower portion 50, with the residual litter replaced only as necessary. The particular kitty litter used is not of consequence to this invention.

FIG. 2 also reveals that I have provided in accordance with this invention, means defining a relative narrow exit passage 32 supported relatively close to the aperture 24. It is through this relatively narrow exit passage that the pet must walk when leaving the litter box. The pet must also enter through this passage, but of consequence is the fact that the passage is made up of an elongate, perforate walkway 31, which serves the function of preventing litter from being tracked out of the litter box as the pet exits therefrom.

Figure 3:
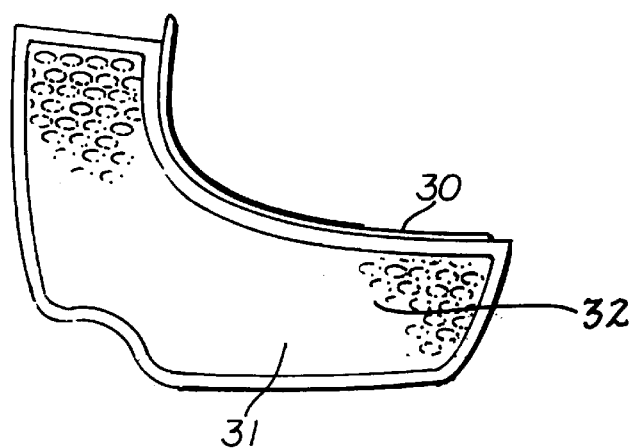
FIG. 3 is a top view of the elongate, relatively narrow walkway across which the animal must walk while entering or leaving the litter box, with one embodiment of the interior wall defining relatively narrow walkway being indicated in this figure.

The narrow, perforate walkway 31 can involve the utilization of an interior wall 30 supported in the lower portion 50 of the litter box, adjacent the entrance-exit aperture 24. The upstanding interior wall 30 is preferably an integral part of the walkway or catwalk 31, but I am not limited to this construction. The interior wall 30 is generally vertically disposed, and preferably possesses curvature, as revealed in several of the figures of drawing. The curvature of the interior wall can be continuous, as indicated in FIG. 3, or the wall can be made up of flat sections 30a, 30b and 30c joined together in such a manner that acute angles are formed between the sections; note FIGS. 2, 4 and 6. As should be obvious, the relatively close relationship of the interior wall 30 to the opening 24 serves to define what may be regarded as an alcove-like exit passage 32. The exit passage 32 formed by the wall-walkway relationship is comparatively narrow, as best seen in FIG. 3.

It is to be understood that I prefer to utilize plastic in the nature of low density polyethylene in the construction of the walkway, which may be of 0.060 inch thickness. As should be obvious, however, I am not to be limited to this particular type of plastic or to the stated thickness. It is also to be noted that the interior wall 30 need not be of smooth or solid construction, for it can be of perforate construction, to readily permit a good circulation of air within the litter box; note FIG. 6, wherein ventilation holes 45 are utilized in the wall.

Figure 4:
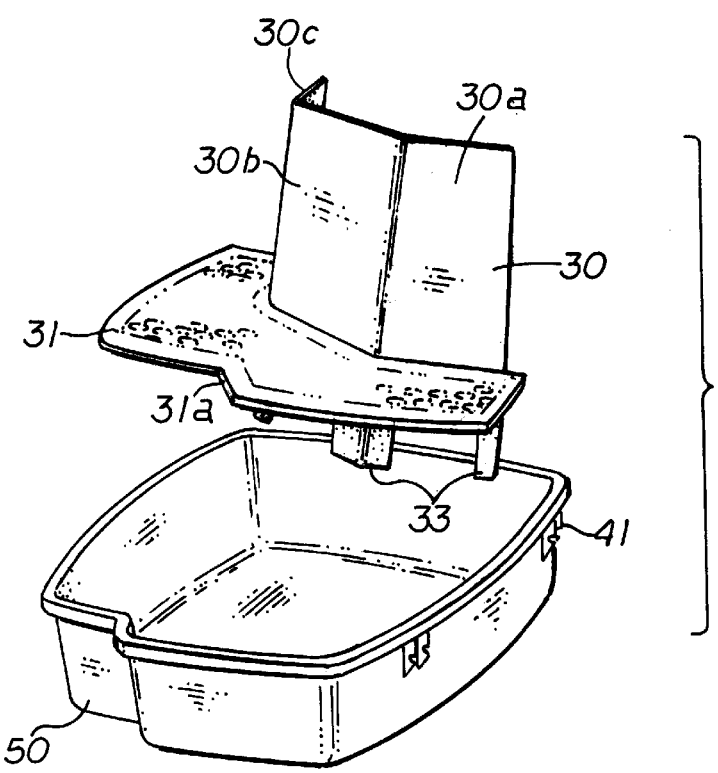
FIG. 4 is a perspective view of an embodiment in which the elongate perforate walkway or catwalk is integral with an interior wall of another configuration, with the wall-walkway unit being shown in an exploded relationship with respect to the lower portion of the litter box.
Figure 5:
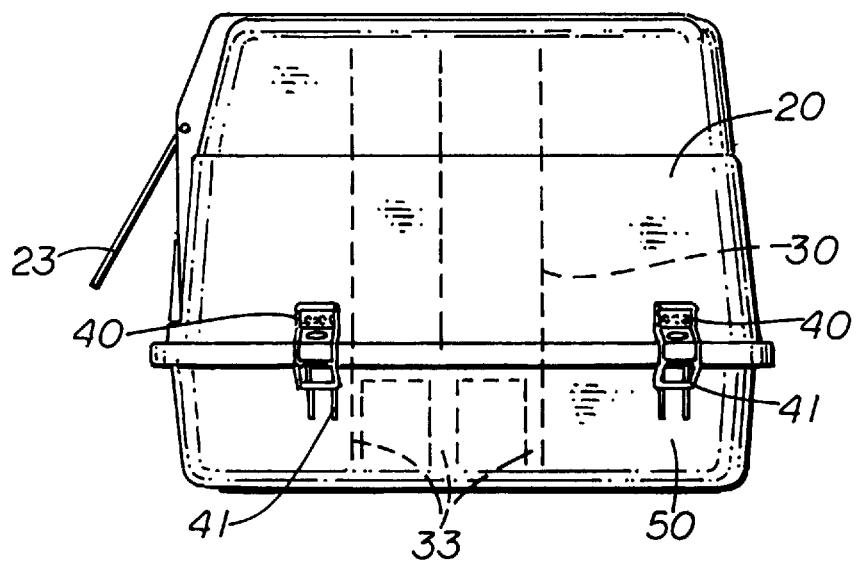
FIG. 5 is a side view of the litter box showing the upper or hood portion secured to the lower portion by the use of conventional latches, with the position of the interior wall used with my novel walkway or perforate catwalk being indicated by the use of dashed lines.
Figure 6:
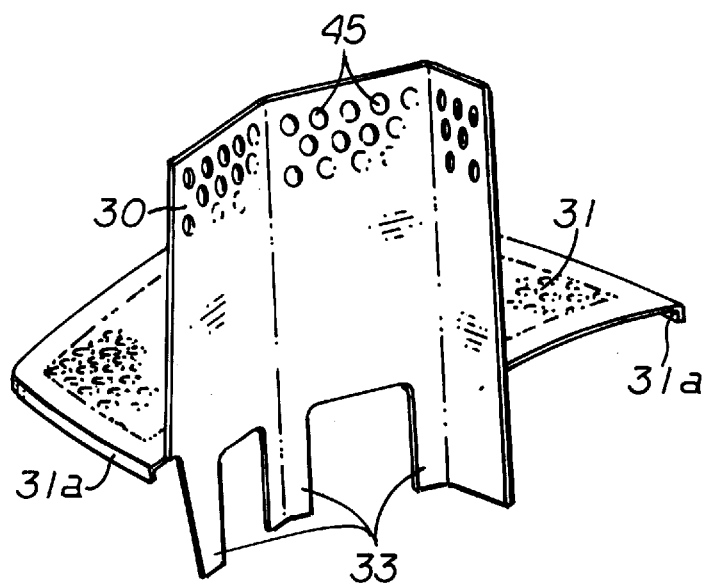
FIG. 6 is a perspective view taken from the rear side of the wall-walkway unit, with this view revealing the use of legs on the lower part of the interior wall such that the walkway will be adequately supported, and disposed at the correct height with respect to the entrance way of the litter box.

The walkway 31, forming an intrinsic part of the exit passage along which the pet must walk as it enters or leaves the litter box, is preferably an integral part of the wall sections 30a, 30b and 30c, as revealed in FIGS. 2, 4 and 6. The lower portions of the interior wall sections have legs 33, visible in FIGS. 4 and 6, which are designed to rest upon the bottom surface of the lower portion 50. Although I prefer for the walkway 31 and the interior wall sections 30a, 30b and 30c to be of one-piece construction, it is to be understood that I am not to be limited to this, for the walkway and the interior wall could be manufactured separately and then cemented or otherwise joined tightly together. The legs 33 are of a length to support the walkway 31 in the position shown in FIG. 2, in which the walkway is disposed closely adjacent the upper edge of the lower portion 50 of the litter box.

As made clear in FIG. 2, the principal portion 30a of the interior wall is located directly in front of the opening or aperture 24, thus providing the relatively narrow exit passage through which the cat or other pet can enter and leave the litter box. However, the interior wall is not so close to the entrance-exit aperture or opening 24 as to cause the door 23, when it swings inwardly, to move into contact with the wall.

As should now be clear, in order for the animal to leave the litter box after depositing its waste in the open section 52 behind the wall 30, it is necessary for the animal to walk on the narrow perforate walkway 31 around the interior wall sections 30a, 30b and 30c in order to make its exit through the aperture 24. Because of the comparatively narrow configuration of the alcove-like exit passage 32, the body of the animal must necessarily be in a substantially parallel relationship with the interior wall sections 30b and 30a at the time the animal is approaching and then exiting through the aperture 24.

From this construction it can be seen that the cat or other pet is forced to walk across the perforate walkway 31 as it leaves the litter box, with the walkway effectively retaining the litter in the litter box, and preventing the litter from being carried by the feet of the pet out into the room and scattered around on the floor. The holes or perforations in the walkway 31 are sized to enable litter carried by the feet of the animal to fall through the holes or perforations. The holes or perforations can vary between ¼" and ½" in diameter, but obviously I am not to be limited to these dimensions.

The walkway 31 has an outer periphery created so as to define an edge or lip 31a that is closely configured to conform to the front inner edge of the lower portion 50. The edge or lip 31a is thus shaped so as to be able to hook over the front inner edge of the lower portion 50, thus locking the walkway 31 closely adjacent the opening or aperture 24; note FIG. 2 in particular. The hook shaped edge portion 31a is clearly visible in FIG. 6.

It is to be noted that the latches 40 are supported from latch holder members 41 secured to the lower portion 50, with the latches being arranged to engage the somewhat enlarged edge 26 utilized around the lower part of upper portion or hood 20 of the litter box. When the latches have been used to releasably clamp the hood 20 to the lower portion 50, the walkway 31 is effectively locked in position and prevented from shifting out of such position.

Because the surface of the walkway 31 is perforate, or in other words, made up of a number of relatively small holes, the walkway serves to permit litter adhering to the feet of the pet to fall back into the lower portion of the device 50, thereby effectively preventing the cat or other pet from tracking the litter at the time he or she emerges from the litter box. Stating this differently, the walkway 31 serves to clean the feet of the pet, with the litter otherwise being tracked out of the litter box instead falling through the holes in the walkway and back into the lower part of the lower portion 50. As is obvious, the use of one type of kitty litter may warrant one particular size of holes in the walkway 31, whereas the use of a different type of kitty litter may warrant the provision of holes of a different size in the walkway.

Because of the advantageous construction I utilize, after the hood or upper portion 20 of the litter box has been separated from the lower portion, the walkway and interior wall 30 can be readily lifted up out of the lower portion 50, to permit the solid wastes and clumps to be raked into a garbage can or trash can or, in some instances, the entire amount of used litter discarded. Thereafter, fresh litter can be placed in the lower portion 50, following which the interior wall and walkway are reinstalled in their functional positions.

It is to be understood that while I prefer to use this litter box with a form of forced ventilation, this is not a firm requirement.

I claim:

1. A litter box formed of an upper portion and a lower portion normally clamped together to define an enclosure for preventing kitty litter being scattered, and for enabling foul odors to be confined, said lower portion being adapted to contain litter for receiving the waste products emanating from the pet, and said upper portion containing an aperture through which the pet can enter or leave, said aperture normally being closed by a door hinged at the top, which is able to swing inwardly to permit the pet to enter, or outwardly to permit the pet to leave, said lower portion containing a curved elongate walkway disposed closely adjacent which is a curved interior wall, said curved interior wall being supported relatively close to the aperture through which the pet can enter or leave, said curved interior wall being placed in such proximity to said aperture as to require the pet to walk for substantially the full length of said curved, elongate walkway and around said curved wall at such time as the pet is to exit from the litter box, said walkway serving to clean the paws of the pet and thereby preventing the pet from tracking portions of the litter out of the litter box.

2. The litter box formed of an upper portion and a lower portion normally clamped together to define an enclosure for preventing kitty litter being scattered as recited in claim 1 in which said elongate walkway is perforate.

3. The litter box formed of an upper portion and a lower portion normally clamped together to define an enclosure for preventing kitty litter being scattered as recited in claim 1 in which said interior wall is attached to said walkway so as to be removed with said walkway from said lower portion at such time as the litter is to be cleansed of solid material.

4. The litter box formed of an upper portion and a lower portion normally clamped together to define an enclosure for preventing kitty litter being scattered as recited in claim 1 in which a grill-like portion is provided in the upper portion of said litter box, and a recess is provided in a surrounding relationship to said grill-like portion, said recess being adapted to removably receive an electrically-powered odor removing component.

5. A litter box formed of an upper portion and a lower portion normally clamped together to define an enclosure in which kitty litter can be contained and foul odors confined, said lower portion being adapted to contain a quantity of kitty litter for receiving the waste products emanating from the pet, and said upper portion containing an aperture through which the pet can enter or leave, said upper portion also containing a grill-like uppermost portion through which foul odors can escape, said lower portion containing a curved, elongate perforate walkway disposed above the kitty litter and extending in the immediate vicinity of said aperture, with a curved interior wall in said enclosure disposed closely adjacent said walkway, about which said walkway curves, a portion of said wall being supported relatively close to said aperture and being placed in such proximity to said aperture as to require the pet to walk for substantially the full length of said perforate walkway at such time as the pet is to exit from the litter box through said aperture, said perforate walkway serving to clean the paws of the pet and thereby preventing the pet from tracking portions of the litter out of the litter box.

6. The litter box formed of an upper portion and a lower portion normally clamped together to define an enclosure as recited in claim 5 in which said interior wall is attached to said walkway so as to be removed with said walkway from said lower portion at such time as the litter is to be cleansed of solid material.

7. The litter box formed of an upper portion and a lower portion normally clamped together to define an enclosure for preventing kitty litter from being scattered as recited in claim 5 in which a recess is provided in a surrounding relationship to said grill-like portion, said recess being adapted to removably receive an electrically-powered odor removing component.

8. The litter box formed of an upper portion and a lower portion normally clamped together as recited in claim 5 in which said curved, elongate walkway is provided with a peripheral lip portion, a portion of which hooks over an inner edge of said front and side walls, thus to form at least part of the support for said walkway, and to firmly anchor said walkway against displacement.

9. The litter box formed of an upper portion and a lower portion normally clamped together as recited in claim 8 in which at least one substantially vertically disposed leg supports a portion of said curved, elongate walkway remote from said lip portion.

10. The litter box formed of an upper portion and a lower portion normally clamped together as recited in claim 5 in which said aperture is equipped with a door hinged at the top and able to swing inwardly or outwardly, depending on the direction of travel of the pet, said door normally serving to help prevent unpleasant odors from the litter box from entering the room, said curved interior wall being spaced sufficiently far from said aperture as not to interfere with the swinging of said door.

11. A litter box formed of an upper portion and a lower portion normally clamped together to define an enclosure in which kitty litter is contained, which enclosure is configured for preventing kitty litter being scattered, said upper portion having a front wall containing an aperture through which the pet can enter or leave, said upper portion also containing a side wall contiguous to said front wall, said lower portion having a rear section adapted to contain litter for receiving the waste products emanating from the pet, a curved, elongate interior wall supported in proximity to said aperture, and in proximity to portions of said front wall and said side wall, a curved, elongate walkway disposed between said curved elongate interior wall, and said front and side walls, the bounding of said curved elongate walkway by said curved elongate interior wall and said front and side walls requiring the pet to walk for substantially the entire length of said walkway and around said curved interior wall in traveling from the front of said device toward said rear section, the pet also being caused to walk for substantially the entire length of said curved elongate walkway as it exits from said rear section, and means on said walkway serving to clean the paws of the pet when exiting said rear section and thereby preventing the pet from tracking portions of the litter out of the litter box.

12. The litter box formed of an upper portion and a lower portion normally clamped together to define an enclosure for preventing kitty litter being scattered as recited in claim 11 in which said elongate walkway is perforate.

13. The litter box formed of an upper portion and a lower portion normally clamped together as recited in claim 11 in which a portion of the periphery of said curved, elongate walkway is provided with a lip portion designed to hook over an upper edge of said front and side walls, thus to form at least part of the support for said walkway, and to firmly anchor said walkway against displacement.

14. The litter box formed of an upper portion and a lower portion normally clamped together as recited in claim 13 in which at least one substantially vertically disposed leg supports a portion of said curved, elongate walkway remote from said lip portion.

15. The litter box formed of an upper portion and a lower portion normally clamped together as recited in claim 11 in which said aperture is equipped with a door hinged at the top and able to swing inwardly or outwardly, depending on the direction of travel of the pet, said door normally serving to help prevent unpleasant odors from the litter box from entering the room, said curved interior wall being spaced sufficiently far from said aperture as not to interfere with the swinging of said door.

* * * * *